Aug. 25, 1931.    R. C. SMALLEY    1,820,837
ADJUSTABLE SUPPORT FOR VACUUM TUBE LIGHTS
Filed June 2, 1926
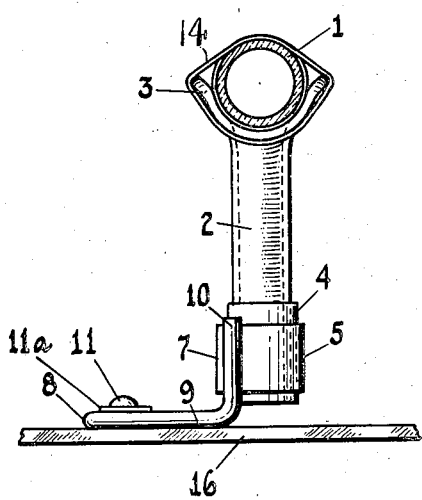
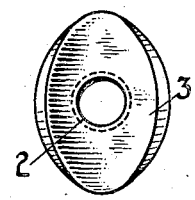
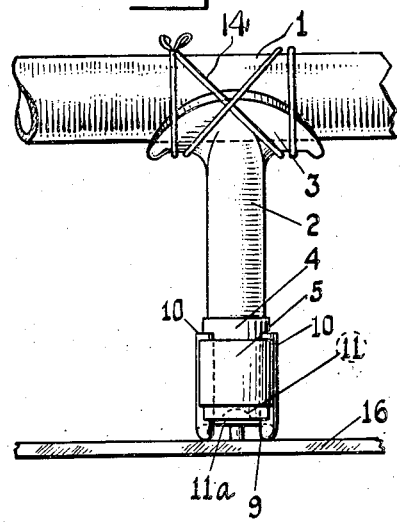
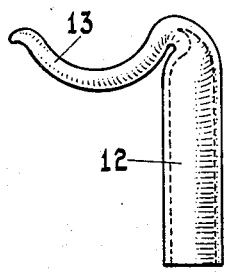
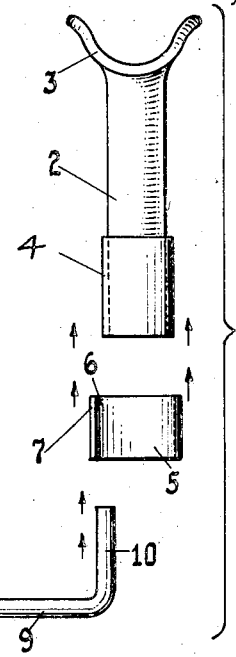
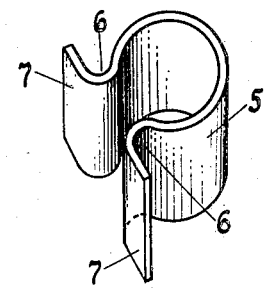
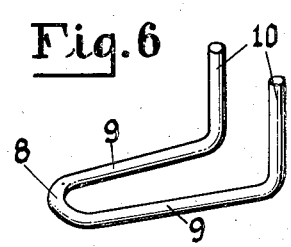
INVENTOR
ROBERT C. SMALLEY
BY
Bohleber & Ledbetter
ATTORNEYS Patented Aug. 25, 1931

1,820,837

UNITED STATES PATENT OFFICE

ROBERT C. SMALLEY, OF ARLINGTON, NEW JERSEY, ASSIGNOR TO CLAUDE NEON LIGHTS, INC., OF NEW YORK, N. Y., A CORPORATION OF NEW YORK

ADJUSTABLE SUPPORT FOR VACUUM TUBE LIGHTS

Application filed June 2, 1926. Serial No. 113,305.

This invention relates to adjustable supports for vacuum tube lights, such as the well known neon lights, in which a column of more or less rarefied gas, such for example, as neon, is caused to glow and radiate light by the passage of an electric current therethrough.

Lamps of this type are widely used in advertising and generally are in the form of relatively long and frequently unusually shaped glass tubing. For instance, it is common to have the tubing bent into the shape of a word, a design or the like. As will be understood, such tubes are more or less fragile, and must be carefully handled and subjected to as little strain as possible.

As these tubes are usually mounted upon a board or base which is frequently hung outdoors where both the lamp and the base are exposed to all kinds of weather, the tube must be positively and reliably mounted on the background, in a way which shall require as little attention as possible. At the same time, since neither the tube nor the base dimensions can be changed after completion, some adjustable means must be provided for supporting tubes from bases in cases where the tube or the base or both fail to conform to the calculated or designed dimensions. In other words, the supporting means must be capable of a certain amount of adjustability but at the same time, must be reliable and positive when once adjusted and set.

It is an object of this invention to provide a support for lights of the class described, which support shall be capable of adjustment in practically any direction, to accommodate variations between portions of the tube and its supporting base, but which when set up, will hold the tube positively and securely.

It is still a further object of this invention to provide a universal support for such lights which is adapted for use with all sizes and styles of lights and which is adjustable as above described.

It is still a further object of this invention to provide such a support for such lights which is relatively economical to construct and simple to assemble and install.

Still other objects will be apparent from the specification.

The features of novelty which I believe to be characteristic of my invention are pointed out with particularity in the appended claims. My invention itself, however, both as to its underlying principles and as to its practical application will best be understood by reference to its specification and accompanying drawings in which:

Figure 1 is a side elevation of a portion of a lamp supported according to my invention.

Figure 2 is a similar view taken at right angles to Figure 1.

Figure 3 shows the top of the supporting member 2.

Figure 4 is a view illustrating the method of assembling the support.

Figures 5 and 6 are respectively perspective views of the collar member and the arm carrying member according to my invention.

Figures 7 and 8 are elevation and plan views respectively of a modified form of spacing element.

In accordance with my invention I provide a spacing element 2 preferably in the form of glass tubing provided at one end with a hook 13 or flare 3 for supporting the lamp tube. I provide also a collar 5 preferably of resilient metal and adapted to encircle the spacing element and to be retained in position by its own resiliency. This collar is formed in such a manner as to provide portions 6 which may be engaged by a pair of substantially parallel arms 10 formed on a third member 8 which coacts with the collar 5 and which is provided with a portion 9 which may be secured to the base plate 16 or background from which the lamp tube 1 is to be supported.

It is to be noted that a great number of adjustments are possible with this combination; in fact, it is what I may term universally adjustable. In the first place the collar 5 is slidable longitudinally along the spacing member 2 and is also rotatable thereon. Also, the parallel arms 10 are slidable along the collar 5 and finally the arm carrying member 8 is slidable and rotatable upon the bolt 11 which secures it to the base plate 16. From this it will be seen that the distance between the lamp tube 1 and the base plate 16 may be increased and decreased in two ways; first by adjusting the collar 5 upon the spacing member 2, and second, by adjusting the position of the collar 5 with respect to the arms 10. Lateral adjustment may be made by rotating the arm carrying member 8 about its pivot and correspondingly rotating the collar 5 upon the spacing member 2 and lateral adjustment may be made by sliding the arm carrying member 8 under its bolt 11.

Referring now more specifically to Figure 1, 1 designates the envelope of a vacuum tube light such as the well known neon light in which a column of neon at low pressure is caused to glow by the passage of an electric current therethrough. The lamp tube 1 is maintained in spaced relation with reference to base plate or support 16 by means of spacing element 2 which is provided with suitable means for receiving the lamp tube 1 such for example as a flared portion 3 which acts as a sort of cradle to receive the lamp tube.

A collar 5 is provided adapted to encircle the spacing element 2 and is preferably constructed of resilient metal and somewhat smaller normally than the spacing element 2 so that when the collar is placed on the spacing element it is slightly spread and tends to clamp itself upon the collar by reason of its resiliency. If desired a layer of cloth or friction tape 4 may be wrapped around the spacing member 2 in order to increase the friction between collar 5 and the spacing element 2 and also to act as a shock absorbing pad.

The collar 5 will preferably be formed of sheet metal bent substantially as shown in Figure 5 to an approximation of the shape of the Greek letter omega, thereby providing spaced wings 7 defining arm receiving portions 6. To cooperate with the collar 5 there is provided an arm carrying member 8 which will preferably be formed by bending relatively heavy and resilient wire into substantially the form of a U having sides 9 and thereafter bending the ends of the sides 9 substantially at right angles to form upwardly projecting parallel spaced arms 10 adapted to slidably engage with the arm receiving portions 6 of the collar 5 so as to grip and support the same. The arm carrying member 8 may be secured to the base plate 16 by means of a bolt 11 passing between the wings 9 and if desired carrying a washer or plate 11A adapted to clamp and hold the wings in position.

In order to assemble the lamp support according to my invention it will be seen by referring to Figure 4 that the tube 2 may be wrapped with a few turns of friction tape 4 at its lower end, and collar 5 will then be spread sufficiently to enable it to be slid axially over the spacer 2 carrying friction tape 4. Arms 10 will then be spread sufficiently to slide into the arm receiving portions 6 of collar 5 and member 8 will be moved to effect this engagement as shown by the arrows of Figure 4. The proper longitudinal adjustment may be made as desired.

In order to assemble a vacuum tube light to the base 16 the latter will be drilled to receive bolts 11 at as many places as it is desired to support the light. The supporting element comprising spacer 2, collar 5 and arm carrying member 8 will be assembled as already described and bolted in its approximate position. A number of tie wires 14 may be provided which are passed one or more times around the lamp tube 1 and the hook 13 or flare 3 as the case may be and fastened. It will be understood that as many supports and tie wires may be used as desired and the spacing may be whatever is found best under the circumstances. After the light has been secured in position by a number of tie wires, a final adjustment may be made of the supports by loosening bolt 11 and sliding or rotating the various parts to bring the spacer 2 into the exact position desired after which the bolt 11 may be tightened.

Referring to Figures 7 and 8, I have shown a modified form of spacer 12 comprising a tube provided with a hook portion 13 preferably formed by softening up the tube at one end and manipulating it to the desired shape as will be understood by any glass blower. The method of assembling a tube with such a modified spacer is substantially the same as that already described except that the lamp tube 1 is carried in hook 13 as will be readily understood.

While I have shown and described certain preferred embodiments of my invention I wish it to be understood that modifications and changes may be made without departing from the spirit and scope of my invention as will be understood by those skilled in the art.

What I claim is:

1. A support for mounting vacuum tube lights upon a base plate, comprising a tube receiving element, a spring collar adapted to encircle said element and a member having a pair of arms arranged for sliding engagement with said collar, and having a portion adapted to be fastened to said base plate.

2. A support for mounting vacuum tube lights upon a base plate, comprising a tube receiving element, a spring collar adapted to encircle said element and formed to define arm receiving portions, and a member having a pair of substantially parallel arms arranged for sliding engagement with said collar, and having a portion adapted to be fastened to said base plate.

3. A support for mounting vacuum tube lights upon a base plate, comprising a tube receiving element, a spring collar adapted to encircle said element and be resiliently retained in position, and having outwardly turned ends defining arm receiving portions, and a member having a pair of substantially parallel arms arranged for sliding engagement with said collar, and having a portion adapted to be fastened to said base plate.

4. A support for mounting vacuum tube lights upon a base plate, comprising a tube receiving element adapted to receive the tube at any point in its length, a collar adapted to encircle said element and having portions formed thereon to receive a pair of arms, and a member having a pair of substantially parallel arms adapted to receive and resiliently retain said collar therebetween, and having a portion adapted to be fastened to said base plate.

5. A support for mounting vacuum tube lights upon a base plate, comprising a tube receiving element adapted to receive the tube at any point in its length, a collar adapted to encircle said element and having portions formed thereon to receive a pair of arms, and a member having a pair of substantially parallel arms adapted to receive and resiliently retain said collar therebetween, said member comprising a wire bent to the form of a U, and having the ends turned at an angle to define said arms.

6. A support for mounting vacuum tube lights upon a base plate, comprising a tube receiving element adapted to receive the tube at any point in its length, a collar adapted to encircle said element and having its end portions turned outwardly to define parallel arm receiving portions, and a member having a pair of substantially parallel arms adapted to receive and resiliently retain said collar therebetween, said member comprising a wire bent to the form of a U, and having the ends turned at an angle to define said arms.

7. A device of the class described comprising a pair of substantially parallel arms connected at one end and encompassing a space adapted to receive bolt securing means and adjustable rotatably and laterally with respect to said securing means, a curved strip having an axis of curvature substantially parallel to the plane of said arms and being slidably adjustable on said arms and being adapted to secure a cylindrical post the latter being slidably and rotatably adjustable with respect to the said strip and being adapted to support a luminescent tube.

8. A support for mounting positive column tube lights upon a base plate, comprising a tube receiving element having a tubular portion, a spring collar adapted to encircle said element and be resiliently retained in position, and having outwardly turned ends defining arm receiving portions, and a member having a pair of substantially parallel arms arranged for sliding engagement with said collar, and having a portion adapted to be fastened to said base plate.

In testimony whereof, I have hereunto set my hand this 21st day of May, 1926.

ROBERT C. SMALLEY.